United States Patent [19]

Peppers et al.

[11] Patent Number: 5,022,087

[45] Date of Patent: Jun. 4, 1991

[54] APPARATUS FOR DETECTING PRIMITIVE PATTERNS IN AN IMAGE

[76] Inventors: Norman A. Peppers, 3619 Hillcrest Dr., Belmont, Calif. 94002; James R. Young, 3433 Cowper St., Palo Alto, Calif. 94306; Gerald A. Pierce, 1028 Eden Bower La., Redwood City, Calif. 94061; Gregory K. Myers, 473 Melrose Ave., San Francisco, Calif. 94127

[21] Appl. No.: 189,542

[22] Filed: May 3, 1988

[51] Int. Cl.$^5$ .............................................. G06K 9/74
[52] U.S. Cl. ........................................ 382/32; 382/31
[58] Field of Search ............................ 382/32, 31, 68; 350/376; 356/389; 367/64

[56] References Cited

U.S. PATENT DOCUMENTS

| | | |
|---|---|---|
| 3,252,140 | 5/1966 | Lemay et al. ............. 382/32 |
| 3,461,301 | 8/1969 | Fitzmaurice et al. ........... 382/32 |
| 3,550,119 | 12/1970 | Rabinow ................ 382/32 |
| 3,965,299 | 6/1976 | Lin ........................... 350/376 |
| 4,573,198 | 2/1986 | Anderson .............. 350/162.13 |
| 4,790,024 | 12/1988 | Peppers et al. ........... 382/32 |
| 4,845,766 | 7/1989 | Peppers et al. ............ 382/32 |

OTHER PUBLICATIONS

Hirsh et al., "Character Reader", IBM Technical Disclosure Bulletin, vol. 14, No. 9, Feb. 1972, p. 2590.
Craig et al., "Bubble Domain Electronic-To-Optical Image Transducer", IBM Technical Disclosure Bulletin, vol. 13, No. 1, Jun. 1970.

Primary Examiner—Michael Razavi
Attorney, Agent, or Firm—Woodcock Washburn Kurtz Mackiewicz & Norris

[57] ABSTRACT

In an apparatus for extracting primitive patterns included in an image such as a character or any other figure, the image subjected to primitive pattern extraction is optical multiplied by a multiplier to form simultaneously in parallel a plurality of optical pattern images of a substantially identical shape, and optical correlation calculation between the plurality of optical pattern images and the primitive patterns which are formed in the various types of primitive masks is performed individually and instantaneously, the various type of primitive masks being arranged at a position spaced apart by a predetermined distance therefrom, thereby detecting beams emitted through the various types of primitive masks. Image multiplication, optical correlation calculation between the primitive pattern and the optical pattern image, and transmission of the result of the optical correlation calculation to the photosensors can be simultaneously performed at the light propagation speed. The apparatus structure can be simplified at low cost, and primitive pattern extraction operations can be performed at high speed.

13 Claims, 3 Drawing Sheets

APPARATUS FOR DETECTING PRIMITIVE PATTERNS IN AN IMAGE

CROSS REFERENCE TO RELATED APPLICATIONS

This application is a continuation-in-part of Ser. No. 048,387, filed May 11, 1987.

BACKGROUND OF THE INVENTION

1. Field of the Invention

The present invention relates to an apparatus for extracting basic shape patterns or primitive patterns included in an image such as a character or any other figure, the image primitive pattern extraction apparatus being suitably applied to an image recognition apparatus such as an OCR (Optical Character Reader).

2. Description of the Prior Art

In conventional image recognition for a character or a figure, a feature extraction process for class classification is performed to discriminate an input image subjected to image recognition from other images and to define a class which is assigned to the input image. The feature extraction process for class classification is an indispensable operation in image recognition since the input image is eventually recognized on the basis of the results of class classification. The features are extracted by a feature extraction apparatus in an image recognition system.

Conventional feature extraction apparatuses are classified into an apparatus using mainly electronic techniques and an apparatus using mainly an optical system.

In a conventional feature extraction apparatus using the electronic techniques, an input image is converted into an image signal, and the image signal is stored in a memory. The image signal is then preprocessed and is subjected to projection processing, thereby extracting the features of the image.

A typical example of the feature extraction method adopting the optical procedure is an optical correlation method generally called as an image casting. Such method is described in the published book (ex: Topics in Applied Physics vol 48., Edited by S. H. Lee, P97, Springer-Verlag). This method uses many optical channels to extract a feature included in a optical pattern image. That is, a microlens forms the optical pattern image on a primitive mask. A light beam passes through a part of the primitive pattern in the primitive mask where the optical pattern image overlaps with the primitive pattern in the primitive mask. This beam is detected by a sensor. If a shape of feature included in the optical pattern image needs to be extracted, the many optical channels must be used to cover all regions of the optical pattern image with many primitive patterns in the primitive masks where each primitive pattern is fabricated in different positions in each primitive mask.

Another typical example of the feature extraction apparatus using the optical system uses image conversion by means of Fourier transform. Such a feature extraction apparatus will be generally described.

A Fourier transform optical system is used in the feature extraction apparatus. The Fourier transform optical system includes a high-resolution projection lens (objective lens) having a predetermined focal length. An object plane (i.e., an input image plane) and an image formation plane are formed on the front and rear focal planes of the objective lens, respectively.

A transmission image (an input image) recorded on a photographic film is located on the object plane, and monochromatic collimated beams are incident on this image. The input image is focused by the objective lens as a Fourier-transformed image on the image formation plane. Therefore, the resultant image is the one obtained by frequency-converting (Fourier transform) the input image.

A matched filter is positioned on the image formation plane. This filter is a mask of a Fourier-transformed image corresponding to a feature to be extracted from the input image. Another high-resolution convex lens (restoration lens) is located in front of the matched filter and is spaced apart therefrom by the focal length of the lens.

Only a pattern beam having the same feature as that of the matched filter, among the pattern beams of the Fourier-transformed image of the input image passes through the matched filter. The Fourier-transformed image of the input image is subjected to so-called spatial filtering. The spatially filtered Fourier-transformed image is inverse Fourier-transformed by the restoration lens to form an image on a second image formation plane. Only an image pattern having a basic shape pattern or a primitive pattern corresponding to the matched filter, among the input image patterns, is formed on the second image formation plane.

If a photosensor is arranged such that its light-receiving surface is aligned with the second image formation surface, the beam passing through the matched filter is condensed by the restoration lens and is incident on the light-receiving surface of the photosensor. By detecting an output of the photosensor, it is discriminated whether the input image has a predetermined primitive pattern. Hence, the input image can be classified.

In the conventional technique using image conversion by means of Fourier transform, however, several special-purpose components such as two high-resolution lenses for Fourier transform, inverse Fourier transform, the matched filter, coherent light source and the like are required. In addition, the input image must be accurately located at a predetermined position and in a predetermined direction.

At the time of assembly and maintenance of the apparatus, high-precision operations are required that cause cumbersome operations. In particular, special care must be paid for alignment of the input image. For example, if the input image is angularly deviated by $\theta$, the deviation is reflected on the frequency plane and hence causes rotation of the Fourier-transformed image through $\theta$. The Fourier-transformed image of the input image which is designed to be aligned with the matched filter pattern is not actually aligned therewith. Feature extraction cannot be performed in practice. In addition, the optical system is undesirably complicated.

The Fourier-transformed image of the input image is repeatedly compared with a large number of matched filters to extract the features. The feature extraction time is undesirably prolonged.

SUMMARY OF THE INVENTION

It is, therefore, an object of the present invention to provide an apparatus for simultaneously extracting basic shape patterns or primitive patterns included in an input image by using a simple optical system.

According to the present invention, there is provided an apparatus for extracting primitive patterns included in an image, comprising:

a multiplier for optically multiplying an image whose primitive patterns are to be extracted, to form simultaneously in parallel a plurality of optical pattern images of a substantially identical shape;

various types of primitive masks which respectively have various types of primitive patterns comprising basic shapes commonly included in a plurality of images subjected to primitive pattern extraction, the primitive masks being arranged at a position spaced apart by a predetermined distance from the plurality of optical pattern images in one-to-one correspondence therewith so that the beams from all points of each optical pattern image are substantially incident on all points of the corresponding primitive pattern, whereby optical correlation calculations between said optical pattern image and said primitive pattern are performed instantaneously; and photodetecting means for detecting the beams which are emitted from the plurality of optical pattern images through the various types of primitive masks, respectively.

In the apparatus having the above arrangement according to the present invention, the plurality of optical pattern images of a substantially identical shape obtained by multiplying an image whose primitive patterns are to be extracted are respectively, independently, optically and simultaneously compared, at a light propagation speed, with the various types of primitive patterns of primitive masks. In each optical channel, a processing beam directing an angle to the optical axis emitted from the optical pattern image focuses a point on the detector element, the processing beams from the diffused light source of the optical pattern image focus infinite numbers of points on the detector elements. Accordingly, an integrated detector output from one channel means a cross correlation between the optical pattern image and the primitive pattern.

In the image primitive pattern extraction apparatus according to the present invention, image multiplication, optical comparison of the multiple images with the primitive patterns, and transmission of the comparison results to the photodetecting means can be simultaneously performed at the light propagation speed. For this reason, the primitive patterns of the image can be extracted at high speed, with a simple low cost apparatus.

DETAILED DESCRIPTION OF THE PREFERRED EMBODIMENTS

An embodiment will be described in which the present invention is applied to an image recognition apparatus.

Image information stored in a memory is read out and displayed as an optical input image on a screen of a display 1 such as a CRT or the like. In this embodiment, the input image is displayed as a negative image having a bright character portion and a dark background portion when the input image is a character image. The display may be an LED display with an LED emitting diffusing light as a light source.

Figure 1:
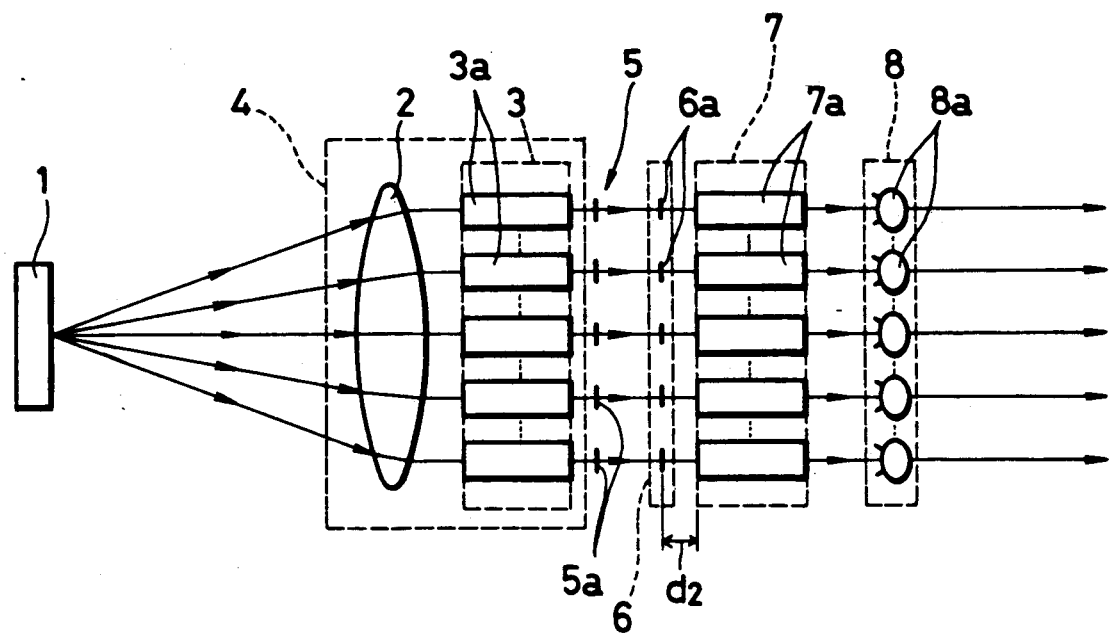
FIG. 1 is a schematic view showing an embodiment in which the present invention is applied to an image recognition apparatus.

A projection lens 2 is located in front of the screen of the display 1 and is spaced apart therefrom by a focal length of the lens 2, as shown in FIG. 1. Therefore, light from the input image displayed on the screen of the display 1 is collimated by the projection lens 2. The collimated beam from the projection lens 2 is incident on a first lens array 3.

The first lens array 3 comprises a large number of image formation lenses 3a (several hundreds of lenses in this case) of gradient index microlenses.

The first lens array 3 may comprise a planar microlens (U.S. Pat. No. 4,509,824) available from Nippon Sheet Glass Co., Ltd.

This planar microlens is formed as follows. A large number of semispherical microaperture gradient index lenses are simultaneously formed on one major surface of a transparent plate substrate to constitute a two-dimensional lens array according to planar techniques. At the same time, a large number of strip-like light-shielding layers are formed on the other major surface of the substrate at predetermined intervals in a direction perpendicular to the array direction of the large number of microaperture microlenses. Surface regions between the large number of strip-like light-shielding layers constitute light-transmitting regions. The microaperture lenses are distributed to have a gradient index which is continuously decreased from its center toward the radial direction. In this case, these lenses constitute the image formation lenses 3a. The aperture of each microaperture lens 3a is set to be about 100 to several hundreds of microns.

A SELFOC LENS ARRAY (U.S. Pat. No. 3,658,407 and U.S. Trademark Registration No. 998,188) available from Nippon Sheet Glass Co., Ltd. may be used as the lens array 3. This SLA is manufactured such that a plurality of layers of columnar gradient index rod lenses (U.S. Pat. No. 3,941,474) (to be referred to as rod lenses hereinafter) are stacked densely such that the refractive indices thereof are continuously decreased from the central axis of the SLA toward the axial direction by an ion exchange technique. 1-$\mu$m thick black silicone resin (light-shielding members) is filled between the rod lenses. In this embodiment, the rod lenses constitute the image formation lenses 3a in the lens array 3. The aperture of each rod lens is set to be about 0.5 to 3 mm.

The planar microlens and the SLA have substantially the same optical function as that of a convex lens. The planar microlens and the SLA are obtained by arranging the microlenses in a two-dimensional array to easily constitute a very small optical system.

The projection lens 2 and the lens array 3 constitute the multiplier 4. The input image formed on the screen of the display 1 and guided to the first lens array 3 through the projection lens 2 is multiplied by the image formation lenses 3a of the lens array 3 at positions in the vicinities of the foci thereof. Therefore, optical pattern images 5a shown in FIGS. 3 to 5 are respectively and simultaneously formed on imaginary image formation planes 5 spaced from the end faces of the image formation lenses 3a by a distance $d_1$ shown in FIG. 2.

Figure 2:
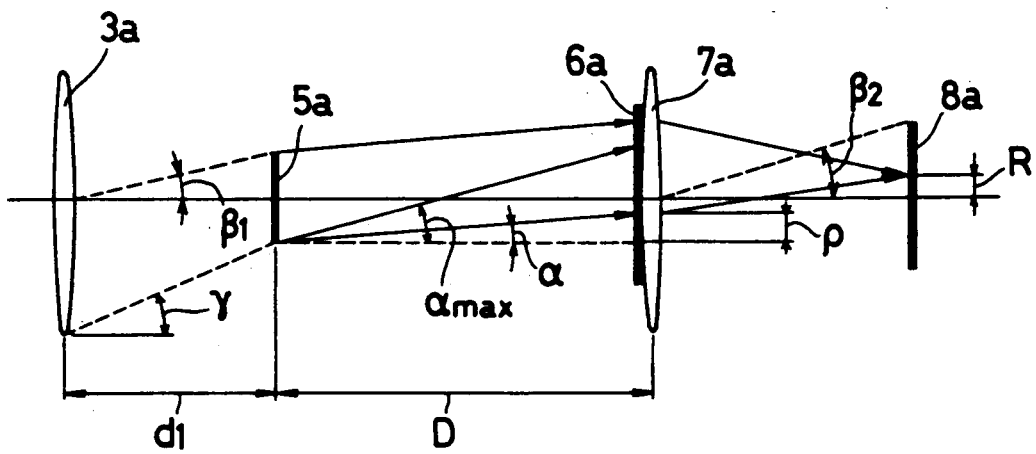
FIG. 2 is a schematic view of the main part of the apparatus shown in FIG. 1 so as to explain optical comparison between the input image and primitive masks.

A mask array 6 is arranged in front of the image formation plane 5. The mask array 6 comprises a large number of reference masks 6a aligned substantially on a plane. Since the reference masks 6a respectively have basic shape patterns or primitive patterns as being described later, the masks 6a are referred to as primitive masks hereinafter. The primitive masks 6a are arranged on the optical axis of the image formation lenses 3a in one-to-one correspondence therewith and are spaced apart from the image formation planes 5 by a predetermined distance D explained later (FIG. 2). Since the primitive masks 6a are located at positions spaced apart from the image formation planes 5 by the predetermined distance D, the optical pattern images 5a are projected on the primitive masks 6a in a manner of an assembly of many collimated light beams. Even if the optical pattern images 5a and the primitive patterns of the primitive masks 6a are not moved relative to each other along a direction perpendicular to the optical axis, the optical pattern image can be optically compared with the primitive patterns. As a result, an optical correlation calculation between said optical pattern image and said primitive pattern can be performed instantaneously.

Figure 3:
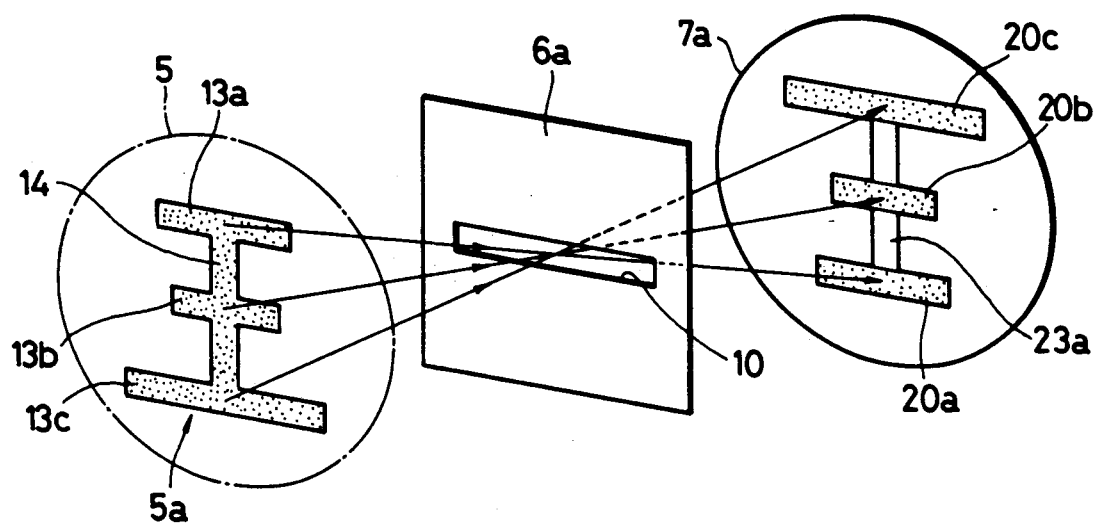
FIG. 3 is a schematic perspective view showing the relationship between the input image, a primitive mask with a horizontal slit, and a condenser lens in the apparatus shown in FIG. 1.
Figure 4:
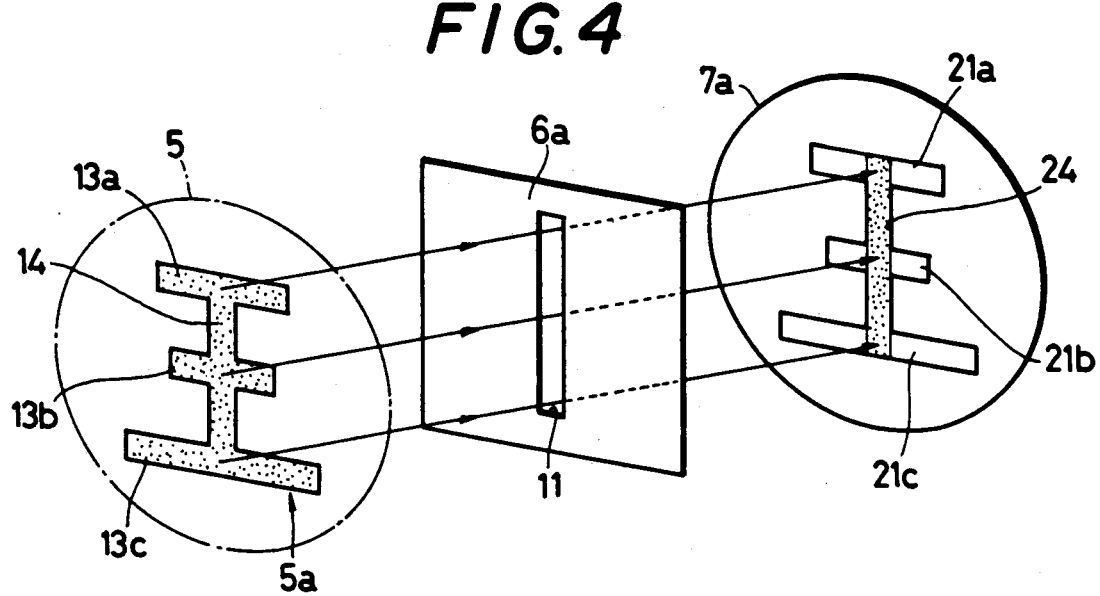
FIG. 4 is a schematic perspective view showing the relationship between the input image, a primitive mask with a vertical slit, and the condenser lens in the apparatus shown in FIG. 1.
Figure 5:
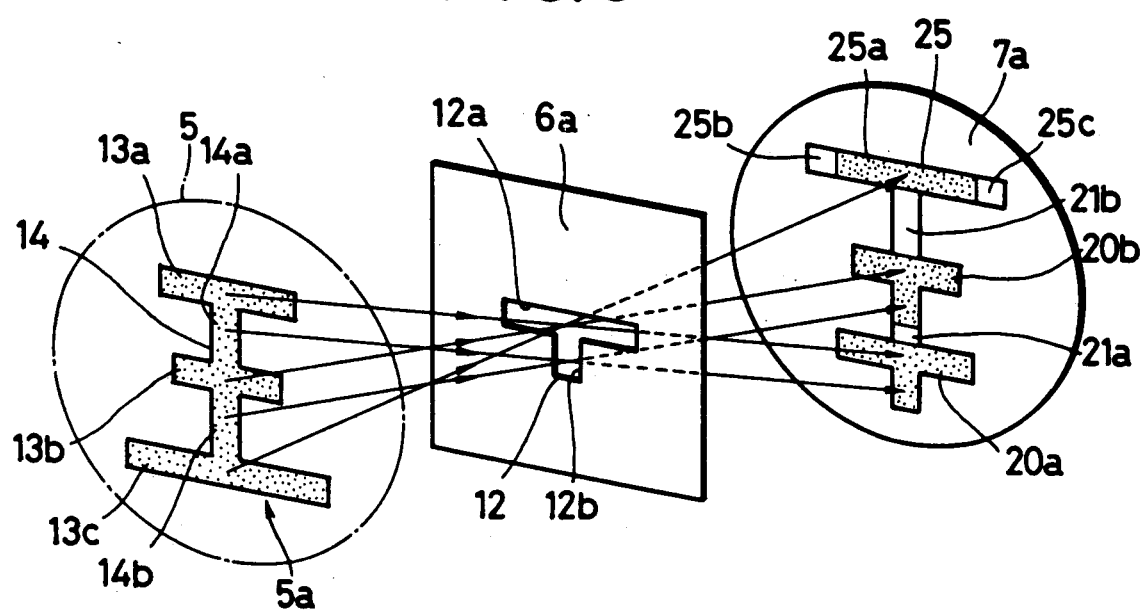
FIG. 5 is a schematic perspective view showing the relationship between the input image, a primitive mask with a T-shaped slit, and the condenser lens in the apparatus shown in FIG. 1.

As shown in FIGS. 3 to 5, primitive patterns 10 to 12 are formed on the primitive masks 6a, respectively. Each of patterns 10 to 12 comprises at least one of known basic shapes commonly included in a large number of input images. The light polarity of the primitive patterns 10 to 12 is the same as that of the input image.

Besides, in FIGS. 3 to 5, one of light traces corresponds to the light beam in FIG. 2. When an object subjected to image recognition is a character, the primitive patterns may be radicals of Chinese characters (the radicals are used for the purpose of classifying and grouping Chinese characters in a dictionary written in the Japanese language for explaining the Chinese letters.), or parts or all of the constituting parts of characters similar to the radicals. The primitive pattern need not be constituted by a single basic shape. As shown in FIG. 5, the primitive pattern may be a simple combination of a plurality of basic shapes.

There are many primitive masks 6a (e.g., several hundreds patterns) corresponding to the primitive patterns 10 to 12 required for extracting the basic shape patterns or the primitive patterns from a large number of input images. Referring to FIGS. 2 to 5, a large number of primitive masks 6a are separated. However, the primitive patterns 10 to 12 may be formed on a common mask substrate to constitute a large number of primitive masks 6a in an array.

A second lens array 7 having a large number of condenser lenses 7a respectively corresponding to the primitive masks 6a is arranged, e.g. in contact with the primitive masks 6a in front of the mask array 6. In this case, the second lens array 7 also may be located at a position spaced apart from the mask array 6 by a distance $d_2$. The second lens array 7 may comprise a planar microlens or an SLA in the same manner as in the first lens array 3. Therefore, the beams passing through the primitive masks 6a are condensed by the corresponding condenser lenses 7a and are guided to a photosensor array 8.

The photosensor array 8 comprises a large number of photosensors 8a arranged in the vicinities of the condensing points of the condenser lenses 7a in one-to-one correspondence therewith. Each photosensor 8a has a photoelectric conversion function. The beams passing through the primitive masks 6a are respectively condensed by the condenser lenses 7a, and the intensities of these beams are detected by the corresponding photosensors 8a. In this case, an output from the photosensor 8a upon detection of the optical beam emitted from a predetermined primitive mask 6a is calibrated as a reference value. Consequently, an output from the photosensor 8a for an optical pattern image 5a having one of the basic shapes constituting the primitive pattern formed on the primitive mask 6a is assigned to a multiple basic pattern included in the optical pattern image 5a by comparing with the reference value. Therefore, the number of the predetermined primitive pattern included in the input image can be discriminated. And the input image can be classified according to the discrimination result. If the levels of only the sensor outputs exceeding a threshold value of the reference value measured by the peak detector are compared to each other, the number of sensor outputs subjected to comparison can be reduced.

Feature extraction in the image primitive pattern extraction apparatus shown in FIG. 1 will be described in detail with reference to FIGS. 2 to 6.

Referring to FIG. 2, cross correlation can be regarded as transversely displacing one function relative to another (displacement is designated $\rho$) and integrating the product of the two functions being calculated on each displacement. The mathematical description of this process is given by $$C(\rho) = \int M(\gamma) I(\gamma + \rho) d\gamma \tag{1}$$

where C ($\rho$) is the correlation function of coordinate $\rho$, M($\gamma$) is a function of coordinate representing the primitive pattern in the primitive mask 6a and I ($\gamma + \rho$) is a function of coordinate ($\gamma + \rho$), which coordinate is displaced by the coordinate $\rho$, representing the optical pattern image 5a. The collimated beam incident from the projection lens 2 to the image formation lens 3a is output from the end face of the lens 3a. The optical pattern 5a is formed at a position of the imaginary image formation plane 5 spaced apart from the end face by a distance $d_1$.

The corresponding primitive mask 6a is located at a position spaced apart from the image formation plane 5 by the predetermined distance D. For this reason, the input image is projected on the primitive mask 6a in an assembly of many collimated light beams. The corresponding condenser lens 7a is in contact with the primitive mask 6a or located at a position spaced apart from the primitive mask 6a by a distance $d_2$. In this manner, in the case shown in FIG. 2, since the predetermined distance D is assured, the collimated beams from all points of the optical pattern image 5a are incident on all points of the primitive mask 6a. The beam through the primitive pattern belonging to the collimated beam displaced by $\rho$ focuses on the part of photosensor 8a at a position R, and the part of the photosensor 8a outputs the current corresponding to the optical energy of the beam through the primitive pattern. Thus, the correlation C(ρ) and the output from the part of the photosensor 8a positioned at R are in one-to-one correspondence. Integrated values of the outputs from the all parts of the photosensor 8a, i.e., the total output of the photosensor 8a, corresponds to integration of the correlation C(ρ) with respect to the coordinate ρ. This means that the optical correlation calculation between the primitive pattern and the optical pattern image can be instantaneously performed on the one optical channel, which is different from a usual manner. In a usual manner, since D=0, if the same optical correlation calculation as mentioned above is performed, the primitive pattern must be continuously shifted with respect to the optical pattern image 5a corresponding to variations of the coordinate ρ. Therefore, a number of optical channels are necessary to extract the prodetermined primitive feature from the optical pattern image 5a. In order to realize such a procedure in the conventional apparatus, it is necessary that a number of primitive masks, with same primitive patterns being formed therein, be prepared, and the optical pattern image is respectively fabricated on these masks.

The predetermined distance D must be determined to allow instantaneous optical-correlation calculation between the primitive masks 6a and the input image. In order to satisfy the above requirement, the predetermined distance D is preferably a value of D or near this value wherein the beams from all points of the optical pattern image 5a are initially incident upon all points of the primitive patterns 10 to 12 of the primitive mask 6a when the value of D is gradually increased from zero. The condenser lenses 7a are in contact with the corresponding primitive masks 6a or spaced apart therefrom by the predetermined distance $d_2$.

As shown in FIG. 2, the primitive mask 6a is spaced apart from the corresponding optical pattern image 5a by the predetermined distance D, light rays incident from all points of the optical pattern image 5a are incident on all points of the primitive mask 6a. A light ray displaced by ρ passes through the primitive mask 6a and is incident on a position R of the photosensor 8a. The position R of the photosensor 8a outputs a current corresponding to the energy of light having passed through the primitive mask 6a. Therefore, the correlation C(ρ) and the output from the position R of the photosensor 8a have a one-to-one correspondence. An integrated value of outputs from all parts of the photosensor 8a, i.e., a total output from the photosensor 8a corresponds to an integrated value of the correlation C(ρ) associated with the coordinate position ρ.

The above analysis implies that the optical correlation calculations between the primitive patterns formed on the primitive masks 6a and the optical patterns 5a are simultaneously performed by one optical channel unlike in the conventional optical correlation calculation. More specifically, in the conventional optical correlation calculation, since D=0, then the primitive pattern must be continuously shifted with respect to the optical pattern image 5a so as to correspond to a change in coordinate position ρ if the same optical correlation calculation as described above is performed. In order to achieve the optical correlation calculation according to the above procedures, a large number of primitive masks 6a having identical patterns at different corresponding positions must be prepared, and the optical pattern images must be respectively formed on these primitive masks 6a. For this purpose, a large number of optical channels are required to extract a predetermined primitive pattern feature.

The predetermined distance D must be determined so that the optical correlation calculation between the primitive mask 6a and the input image is instantaneously performed. In order to satisfy this condition, the predetermined distance D is preferably set to be a value or near this value given such that light rays from all points of the optical pattern image 5a are about to be initially incident on all points of the primitive patterns 10 to 12 of the primitive masks 6a when the distance D is gradually increased from zero. The predetermined distance can be determined as follows.

Referring to FIG. 2, each image formation lens 3a has an aperture $D_1$ and a focal length $F_1$ (=$d_1$). The corresponding optical image pattern 5a opposes the lens 3a at a half image angle $\beta_1$. For this reason, a diameter $D_i$ of the optical image pattern 5a is given as $2F_1 \tan \beta_1$. Each condenser lens 7a has an aperture $D_2$ and a focal length $F_2$, and its condensed image oppose the lens 7a at a half image angle $\beta_2$. The primitive or reference mask 6a is in contact with the corresponding lens 7a and has a diameter $D_m$. The mask 6a must satisfy the simple condition $D_m < D_2$.

The display 1 is a diffusion light source and can sufficiently illuminate an image within the aperture of the projection lens 2. When the lens 3a receives the collimated light beam from the lens 2, the optical pattern image 5a is formed. Of all light rays from all the points of the optical pattern image 5a, some rays propagate parallel to each other at, e.g., an angle α with respect to the optical axis. The light rays propagating in a direction at the angle α with respect to the optical axis are regarded as collimated light rays as a shading beam. The collimated rays are incident at a position spaced by the displacement defined by the position R from the optical axis of the photosensor 8a.

The light distribution of the collimated beams incident on the mask 6a spaced by the distance D is functionally the same as that of the optical pattern image 5a. However, the collimated rays are displaced by $|\rho|=D \tan \alpha$ on the mask 6a. Therefore, the light condensed by the condenser lens corresponds to an integrated value of multiplications of two functions respectively corresponding to the reference pattern and the displaced optical image. The integrated value of the multiplications is mathematically equal to the correlation C(ρ) between the optical pattern image 5a and the reference pattern of the reference mask 6a.

A maximum displacement $\rho_{max}$ is given as follows:

$$\rho_{max} = (D_i + D_m)/2 \qquad (2)$$

therefore, a required maximum angle $\alpha_{max}$ is represented as follows:

$$\tan \alpha_{max} = \rho_{max}/D \qquad (3)$$

If the required maximum angle $\alpha_{max}$ exceeds an angle γ, all light rays emitted from the area corresponding to the aperture of the lens 3a can not contribute to the optical correlation calculation. In this case, the optical distribution of the photosensor 8a which corresponds to the lens 7a does not represent the correlation function. Therefore, the necessary condition for the optical distribution which represents a desired correlation in the photosensor 8a is given as follows:

$$2(d_1/D_1)(\tan \beta_1 + \rho_{max}/D) < 1 \quad (4)$$

If the practically important condition $D_m = D_i$ is established, although this condition is a specific one, the above condition can be simplified as follows:

$$D < 2d_1\{p/(1-p)\} \quad (5)$$

where p is a ratio defined as $D_i/D_1$.

According to inequality (5), the distance D may be determined so that it exceeds the value of the left-hand side when the size of the optical pattern image 5a and the size and characteristics of the used lens 3a and the like are determined. In this case, these values are determined to exceed the value of the left-hand side. In this case, the upper limit of D does not theoretically exist. That is, even if the distance D is sufficiently long, the optical correlation calculation can be theoretically performed.

When a practical apparatus is to be arranged, however, lower and upper values $D_{min}$ and $D_{max}$ of the distance D are given due to limitations such as an apparatus size, brightness of the input image, and the characteristics of constituting components of the optical system. The practical lower and upper values $D_{min}$ and $D_{max}$ of the distance D can be given as follows:

$$D_{min} = 0.2 \cdot d_1 \quad (6)$$

$$D_{max} = D_i/(2\tan\alpha) \quad (7)$$

The diameter $D_i$ of the optical pattern image 5a falls within the range of 40 μm to 10 mm and most preferably in the range of 100 μm to 1 mm. As described above, the first lens array 3 comprises the planar microlens or the SLA. In this case, the image formation lenses 3a are constituted by microaperture lenses or rod lenses. The apertures ($D_1$) of the microaperture and rod lenses are respectively 100 to several hundreds of microns (typical value: 300 μm) and 0.5 to 3 mm (typical value: 1 mm). If these lenses are used to constitute the image formation lenses 3a, the practical range of the focal length $d_1$ is about 50 μm to 20 mm. The minimum value $D_{min}$ takes any value in the range of 10 μm to 4 mm from equation (6). In this case, the distance D must be so set as to satisfy condition (5).

The maximum value $D_{max}$ will be described with reference to equation (7). The angle $\alpha$ depends on a numerical aperture NA of the image formation lens 3a. When the image formation lens 3a is constituted by a microaperture lens, a rod lens, or the like as described above, condition NA=0.1 to 0.6 is preferably established. Condition NA=0.2 to 0.3 is most preferable. In this case, the angle $\alpha$ falls within the range of 5.7° to 37° and 11.5° to 17.5° (most preferable) for the respective conditions. Since condition $D_i$=40 μm to 10 mm and preferably $D_i$=several hundreds of microns to 1 mm, the upper value $D_{max}$ falls within the range of 26.5 μm to 50 mm and preferably 100 μm to 2,46 mm.

The typical practical range of the value $D_{max}$ falls within the range of about 1 to 20 mm.

Judging from the above results, the distance D can fall within the range of 10 μm to 20 mm. From a more practical viewpoint, the distance D preferably falls within the range of 0.1 mm to 10 mm and most preferably 0.3 mm to 5 mm.

The relationship between the optical pattern image 5a, the primitive mask 6a and the condenser lens 7a will be described with reference to FIGS. 3 to 5.

Referring to FIGS. 3 to 5, the corresponding condenser lens 7a is located at a position spaced apart from the primitive mask 6a by a distance $d_2$ and an input image represents Chinese character " ". In the case of FIG. 3, the primitive pattern formed on the primitive mask 6a comprises a light-transmitting horizontal slit 10 having a predetermined width substantially at the center of the mask 6a. In this case, beams from three horizontal parallel line segments 13a, 13b, and 13c of the optical pattern image 5a pass without any change through the horizontal slit 10. The passing beams are projected as an inverted image on the condenser lens 7a. Therefore, three strongly bright parts 20a, 20b, and 20c are formed on the light-receiving surface of the lens 7a. A beam from one vertical line segment 14 of the optical pattern image 5a is substantially perpendicular to the horizontal slit 10. For the reason, one weakly bright part 23a is formed on the light-receiving surface of the condenser lens 7a. In this case, only the optical beams parallel to the optical beam which forms the strongly bright parts 20a, 20b, and 20c is condensed to the corresponding same (common) point on the photosensor 8a by the condenser lens 7a. Therefore, an output from the corresponding photosensor 8a allows detection that the input image has three horizontal line segments 13a, 13b, and 13c or equivalent horizontal line segments.

The primitive pattern shown in FIG. 4 comprises a light-transmitting vertical slit 11 extending at a predetermined width substantially at the center of the mask 6a. Then, only the optical beams being parallel to each other among optical beams passing through the slit 11 are condensed to the corresponding same point on the photosensor 8a. In this case, unlike in the case of FIG. 3, three weakly bright parts 21a, 21b, and 21c and one strongly bright part 24 are formed on the light-receiving surface of the condenser lens 7a. An output from the photosensor 8a corresponding to the condenser lens 7a allows detection that the input image has one vertical line segment 14 or equivalent vertical line segments.

In the case of FIG. 5, the primitive pattern formed on the primitive mask 6a comprises a T-shaped slit 12 formed substantially at the center of the mask 6a. A horizontal line segment 12a and a vertical line segment 12b of the T-shaped slit 12 are shorter than the horizontal and vertical slits 10 and 11 (FIGS. 3 and 4). In the case of FIG. 5, the T-shaped component of the optical pattern image 5a is primarily extracted through the T-shaped slit 12. In this case, the T-shaped component of the optical pattern image 5a is a combination of a horizontal line segment 13a and an upper vertical line segment 14a, and a combination of a horizontal line segment 13b and a lower vertical line segment 14b. Collimated-beam projection parts 20a and 20b corresponding to the T-shaped component is formed as a transmitted projection image of the T-shaped component.

The horizontal line segment 12a and the vertical line segment 12b of the T-shaped slit 12 are relatively short, as described above. The two vertical line segments 14a and 14b of the optical pattern image 5a allow formation of weakly bright parts 21a and 21b on the light-receiving surface of the condenser lens 7a. Since the remaining horizontal line segment 13c is extracted through the T-shaped slit 12, a central strongly-bright part 25a and end weakly-bright parts 25b and 25c are formed on the light-receiving surface of the condenser lens 7a. An output from the corresponding photosensor 8a allows recognition that the input character " " has two or three T-shaped components (or horizontal and/or vertical line segments equivalent thereto).

According to the image primitive pattern extraction apparatus having the arrangement described above, after the input image is displayed on the display 1, multiplication of the input images, optical comparison between the multiple image and the various types of primitive patterns 10 to 12, and condensing of light from the primitive mask 6a by means of the condenser lens 7a, can be instantaneously performed at the light propagation time. The condensed beams can be simultaneously detected by a large number of photosensors 8a at high response speed. Primitive pattern extraction by optical correlation calculation between the input image (an unknown pattern) and a primitive pattern (a known pattern) of the reference shape mask can be simultaneously performed at high speed.

In the above embodiment shown in FIGS. 3 to 5, the input image exemplifies a relatively simple Chinese character, i.e., " ".

However, the primitive patterns can be similarly extracted for other characters having more complicated patterns. According to the present invention, the input image to be recognized includes alphanumeric symbols (i.e., letters and Arabic numerals), Japanese *hiragana* characters, Japanese *katakana* characters, and Chinese characters. In this case, characters may be printed characters of a Gothic type, a Ming type or the like, or handwritten characters. The present invention can also be applied to class classification or recognition of various figures excluding characters. In this case, the primitive patterns formed in the primitive masks 6a include an oblique slit, a loop slit (e.g., a circle and a rectangle) and a radial slit in addition to the horizontal slit 10, the vertical slit 11 and the T-shaped slit 12, respectively, shown in FIGS. 3 to 5. By using these slits, at least one primitive pattern feature such as a horizontal component, a vertical component, an oblique component, a circumferential component and a radial component can be extracted from the optical pattern image 5a in each optical channel respectively.

Various types of primitive patterns of various types of primitive masks 6a used in the above embodiment may be predetermined patterns. Therefore, the primitive patterns can be used as fixed patterns so that the predetermined patterns are not changed into other patterns.

The fixed masks 6a typically constitute a two-dimensional mask array 6. In this case, different types of primitive patterns can be simultaneously formed on a common transparent mask substrate by using a positive polarity (black patterns on the white background) or a negative polarity (white patterns on the black background) according to the simultaneous photolithographic process. By using film equipment, a two-dimensional array of similar primitive patterns can be formed. In addition, the primitive masks 6a as fixed masks may be independently formed as needed.

Furthermore, a liquid crystal display device may be used as a display means to constitute a variable mask of a spatial modulation element for producing variable primitive patterns. In this case, the spatial modulation element 6a is arranged such that a plurality of films including a liquid crystal and orientation films are sandwiched between one glass substrate on which a TFT matrix is formed to drive pixel (picture element) electrodes and the other glass substrate on which a transparent common electrode is formed. Polarizing plates are formed on outer surfaces of the glass substrates, respectively.

The spatial modulation element 6a includes as peripheral units a data base, an I/0 control unit, a refresh unit, a scanning register and a data signal register. As for the data base, data signals associated with reference data for forming various types of primitive patterns are filed in a memory. The I/0 control unit outputs a predetermined control signal in response to a main control signal, reads out a data signal of predetermined reference data from the data base, and outputs the readout data signal to the refresh unit. The refresh unit refreshes the contents of the scanning register and the data signal register in accordance with the data signal and selectively drives the TFT matrix.

A voltage is applied between the corresponding pixel electrode and the common electrode to improve a transmittance of the corresponding liquid crystal portion. Therefore, the spatial modulation element 6a can display a predetermined primitive pattern of a liquid crystal pattern. In this state, when light from the copied optical pattern image 5a is incident, an optical correlation calculation is performed with the primitive pattern of the liquid crystal display.

As described above, when the primitive mask 6a is constituted as the variable mask comprising the spatial modulation element and the desired reference data is transferred from the data base to the spatial modulation element 6a, various types of primitive patterns 9 corresponding to the reference data can be formed.

Having described illustrative embodiments of the invention with reference to the accompanying drawings, it is to be understood that the invention is not limited to such precise embodiments, and that various changes and modifications may be effected therein by one skilled in the art without departing from the scope and spirit of the invention as defined in the appended claims.

In the above embodiment, the line width of the optical pattern image 5a formed on the image formation plane 5 is substantially the same as those of the primitive patterns 10 to 12. However, the line width of the optical pattern image 5a may be different from those of the primitive pattern 10 to 12. For example, the line width of the primitive patterns 10 to 12 may be slightly larger than those of the optical pattern image 5a.

In the above embodiment, the photodetecting means comprise photosensors 8a having photoelectric conversion functions, and the beams condensed by the condenser lenses 7a are directly guided to the photosensors 8a respectively. However, the beam of each condenser lens 7a may be guided to another reference mask, and the beam from this reference mask may be detected by a photosensor or the like.

In the above embodiment, the first lens array 3 is separated from the mask array 6, and the imaginary image formation plane 5 exists therebetween.

However, the first lens array 3 and the mask array 6 can be constituted as a single body such that an optical axis of each image formation lens 3a is aligned with that of the corresponding primitive mask 6a.

The first assembly will be described. A frame-like housing comprising a light-shielding member and having a thickness of $(d_1+D)$ and a predetermined frame width is used to form this assembly. When planar microlens or SLA is used to constitute the lens array 3, one end face of the frame portion of the housing is mounted at the outer portion of the lens array 3 on the light output end face side. The mask array 6 is mounted on the other end face of the frame portion. With this arrangement, the housing serves as both a spacer and a light-shielding body. In this case, the primitive masks 6a are formed as a two-dimensional array so as to correspond to the layout of the microaperture lenses or rod lenses constituting the lenses 3a.

In the hollow portion formed between the light output end face of the lens array 3 and the mask array 6, a large number of multiplied optical pattern images 5a are respectively formed on the optical axes at the focal length $F_1$ ($=d_1$) of the lenses 3a. Optical correlation calculations are independently performed between a large number of optical pattern images 5a and the various types of primitive patterns, respectively. Therefore, primitive pattern features included in the optical pattern images 5a can be extracted through a large number of primitive masks 6a, respectively.

The mask array 6 can be formed according to known hard mask fabrication techniques including a series of processes such as formation of a blank plate, formation of a resist pattern and etching. In this case, the formation surface sides of the mask patterns of the hard masks constituting the mask array 6, i.e., the primitive patterns, are mounted on the other end face of the frame portion of the housing.

The primitive patterns of the primitive masks 6a constituting the mask array 6 may have a positive polarity (black patterns on the white background) or a negative polarity (white patterns on the black background) in accordance with a display polarity of the input image. In addition, the mask array 6 can be formed by using an opaque film of a negative polarity in which the primitive patterns are transparent or a transparent film of a positive polarity in which the primitive patterns are opaque.

The second assembly is formed in the following manner. When an SLA is used to form the first lens array 3, the lens array 3 may be in tight contact with the mask array 6 such that the primitive masks 6a respectively correspond to the output end faces of the rod lenses (image formation lenses) 3a constituting the SLA 3. The image formation condition can be changed by changing the lens length of the rod lens 3a. For this reason, in the second assembly, when the lens length is set to be relatively long, the optical pattern image 5a can be formed on the optical axis within the lens spaced by an optical distance D' from the output end face of the corresponding rod lens 3a.

Optical correlation calculations are independently formed between the optical image patterns 5a formed inside the corresponding lenses 3a and the primitive patterns of the primitive masks 6a mounted on the output end faces of the lenses 3a. As a result, primitive pattern features of the optical pattern images 5a are extracted through the corresponding primitive masks 6a.

The mask array 6 in the second assembly is prepared in the following steps. A thin light-shielding film (e.g., high-purity chromium) is formed on the output end face of the lens array 3 constituted by an SLA or the like in accordance with a known thin-film formation technique such as PVD (Physical Vapor Deposition) or CVD (Chemical Vapor Deposition). Thereafter, a predetermined primitive pattern is formed on the output end face of each lens 3a by photolithographic techniques with a positive or negative polarity, thereby forming the mask array 6. In this case, the mask array 6 may be formed by direct drawing of primitive patterns according to a resistless lithographic technique such as ion beam lithography.

Furthermore, a hard mask may be formed using the above-mentioned hard mask fabrication technique to constitute the hard mask array 6. In this case, the pattern formation surface of the mask array 6 consisting of the hard masks is mounted in tight contact with the output end face of the lens array 3. In addition, the mask array 6 may be coated on the output end face of each lens 3a by using a printing technique.

As described in each of the first and second assemblies, when the first lens array 3 and the mask array 6 are combined to form a single body, positioning precision of the primitive masks with respect to the optical axis of an optical system can be improved, thereby simplifying assembly of the apparatus.

The third assembly may be prepared as follows. The mask array 6 and the second lens array 7 are constituted by a single body such that the axes of the primitive masks 3a are respectively aligned with those of the corresponding condenser lenses 7a.

In the third assembly, in order to assure the distance $d_2$ between the mask array 6 and the second lens array 7, a frame-like housing (thickness: $d_2$) of a light-shielding member as described above is used to constitute a single body of the mask array 6 and the second lens array 7.

The fourth assembly may be further prepared as follows. When a planar microlens or an SLA is used to form the second lens array 7, the lens array 7 may be set in tight contact with the mask array 6 such that the primitive masks 6a are respectively aligned with the incident end faces of the microaperture lenses or the rod lenses. The mask array 6 may be formed by using a process technique including a thin-film formation technique (e.g., PVD or CVD) and a photolithographic technique as well as a printing technique.

The fifth assembly may be constituted by a single body such that optical axes of the first lens array 3, the mask array 6 and the second lens array 7 are aligned with each other.

In this case, a transparent member (refractive index: n) is used to serve as a spacer and an optical medium. The thickness of this transparent member is n ($d_1+D$). The mask array 6 is formed on the incident end face of the planar microlens or the SLA constituting the second lens array 7. The transparent member having a predetermined thickness is sandwiched between the output end face of the first lens array 3 and the incidenty end face of the second lens array having the masks 6a thereon. In the transparent member, the mask array 6 may be formed on the end face which is in contact with the incident end face of the second lens array 7. In this assembly, the outer surfaces of the transparent member are preferably covered with a light-shielding member.

In each of the fourth and fifth assemblies as described above, the light-receiving surface of the sensor array 8 is preferably located at the position of the rear-side focal point of the second lens array 7. In this case, an image sensor having a pixel arrangement is used as each photosensor 8a constituting the sensor array 8.

When the optical system is arranged as described above, light associated with optical correlation is incident through the corresponding primitive pattern on the corresponding condenser lens 7a located in tight contact with the corresponding primitive mask 6a. Light subjected to refraction within the condenser lens 7a is focused on the light-receiving surface of the corresponding photosensor 8a located at the rear-side focal point. This image is an optical pattern image having a bright part (corresponding to the primitive pattern feature) which has a higher correlation degree and a dark part having a low correlation degree, as is apparent from the description with reference to FIG. 2. Images having substantially the same characteristics as those formed on the light-receiving surfaces of the condenser lenses 7a are formed on the light-receiving surfaces of the photosensors 8a, respectively, as shown in FIGS. 3 to 5.

Since each photosensor 8a comprises an image sensor as described above, a projected image is photoelectrically converted by each pixel, and the converted signal is extracted as an image signal. When this image signal is processed, the types, number and positions of primitive pattern features included in the input image can be obtained as information. Therefore, various types of image information in the feature extraction process are reflected in the next recognition process, thereby increasing an image recognition rate. A matrix-like projection photosensor disclosed in U.S. Ser. No. 48,387 (filed on May 11, 1987) is preferably used as the image sensor constituting the photosensor 8a. In this projection photosensor, photosensor elements each having a square light-receiving surface are arranged in a matrix manner so that edges of the elements are adjacent to each other, thereby constituting a square light-receiving surface as a whole.

In this case, if $D_1=300$ μm, $D_i=240$ μm, $D_m=240$ μm$^2$, and $D_2=400$ μm, then the size of the projection photosensor is set to be 300 μm$^2$. Each photosensor element serving as a pixel can be set to be, e.g., 30 μm$^2$, so that the number of pixels can be about 100. It is possible to obtain parallel signals according to a recent IC wiring technique (e.g., lead wires are connected to all photosensor elements corresponding to the pixels) since the number of pixels is not so large. As the signals can be simultaneously read out from all pixels and parallel processing can be performed, high-speed image information processing can be performed.

In addition, an image sensor constituting the photosensor 8a may be, e.g., a known X-Y addressing MOS image sensor, a frame transfer (FT) CCD, an interline transfer (ILT) CCD, or the like.

The sensor array 8 may also be added to the fifth assembly to constitute a single body (sixth assembly).

In this case, for example, a planar microlens is used as the second lens array 7. The thickness of the transparent plate substrate is set to be substantially equal to the focal length $F_2$ of the microaperture lens 7a so as to form an image on an output end face. The sensor array 8 is mounted on the output end face of the second lens array (planar microlens) 7. According to the sixth assembly, the optical axes of the first lens array 3, the mask array 6, the second lens array 7 and the sensor array 8 are aligned with each other to constitute a single body. In this case, the image sensor described with reference to the fifth assembly is used as the sensor array 8.

According to each of the fifth and sixth assemblies described above, positioning precision of the respective constituting elements of the optical system can be improved, and assembly of the apparatus can be further simplified. In addition, the extracted primitive pattern feature also provides its positional information. Therefore, various kinds of information associated with the primitive pattern feature can be obtained, and a recognition rate in the next recognition processing can be increased.

In the above embodiment, if the primitive mask 6a comes close to the photosensor 8a, the condenser lens 7a may be omitted.

What is claimed is:

1. An apparatus for detecting basic shapes defined by primitive patterns in an image, comprising:

multiplier means for optically multiplying an image whose primitive patterns are to be extracted to form simultaneously in parallel a plurality of optical pattern images of a substantially identical shape, said multiplier means comprising at least one image formation lens for forming said plurality of optical pattern images;

various types of primitive masks which respectively have various types of primitive patterns comprising basic shapes commonly included in a plurality of images subjected to primitive pattern extraction, the primitive masks being arranged at a position spaced apart by a predetermined distance D from the plurality of optical pattern images in one-to-one correspondence therewith so that beams from all points of each optical pattern image are substantially incident on all points of the corresponding primitive pattern, said predetermined distance D being at least 10 μm and satisfying the inequality $D<2d_1(p/(1p))$, where $d_1$ represents a distance between said multiplier means and said optical pattern images and p represents the ratio of the size of said optical pattern images to the size of the aperture of said image formation lens, whereby an optical correlation calculation between said optical pattern image and said primitive pattern is performed instantaneously; and photodetecting means for detecting the beams which are emitted from the plurality of optical pattern images through the various types of primitive masks, respectively.

2. An apparatus according to claim 1, wherein the predetermined distance falls within a range of 0.1 to 10 mm.

3. An apparatus according to claim 1, wherein the predetermined distance falls within a range of 0.3 to 5 mm.

4. An apparatus according to claim 1, wherein said various types of primitive masks are constituted as fixed masks in which said various types of primitive patterns are respectively predetermined patterns which cannot change to other patterns.

5. An apparatus according to claim 1, wherein said primitive masks are respectively constituted by spatial modulation elements, each spatial modulation element comprising a data base in which reference data to form said various types of primitive patterns are stored and filed, and a control unit for reading out the reference data from the data base by a control signal to refresh contents of a scanning register and a data signal register, thereby causing a display medium to display the pattern corresponding to the readout reference data, and said various types of primitive patterns being able to be changed to various types of patterns in response to the reference data transferred from the data base by the control signal of the control unit.

6. An apparatus according to claim 1, wherein said multiplier comprises:

a projection lens located at a position spaced apart by a focal length thereof from a position of the image whose primitive patterns are to be extracted; and a plurality of image formation lenses which are arranged to have parallel optical axes at a position spaced apart by a distance required to form an image from the projection lens, and are formed in one-to-one correspondence with said various types of primitive masks, said plurality of image formation lenses being adapted to form the plurality of optical pattern images of a substantially identical shape upon reception of collimated beams from said projection lens.

7. An apparatus according to claim 6, further comprising a plurality of condenser lenses which are arranged to have parallel optical axes at a predetermined position in one-to-one correspondence with the various types of primitive masks, said plurality of condenser lenses individually receiving beams through said various types of primitive masks to condense the beams and supplying the condensed beams to said photodetecting means.

8. An apparatus according to claim 7, wherein said various types of primitive masks are formed as a two-dimensional mask array on a common optical member in one-to-one correspondence with said plurality of optical pattern images.

9. An apparatus according to claim 8, wherein said photodetecting means comprises a plurality of photosensors in one-to-one correspondence with said plurality of condenser lenses so as to individually receive and detect the beams from said plurality of condenser lenses.

10. An apparatus according to claim 9, wherein at least said mask array and said plurality of condenser lenses among said plurality of image formation lenses, said mask array, said plurality of condenser lenses and said plurality of photosensors are arranged as a single body such that optical axes of said primitive masks are respectively aligned with those of said plurality of condenser lenses.

11. An apparatus according to claim 10, wherein said mask array is arranged in tight contact with said plurality of condenser lenses so that optical axes of said primitive masks are respectively aligned with those of said condenser lenses.

12. An apparatus according to claim 11, wherein light-receiving surfaces of said plurality of photosensors constituting said photodetecting means are located at a position of a rear-side focal point of said plurality of said condenser lenses.

13. An apparatus according to claim 12, wherein said plurality of photosensors constituting said photodetecting means comprise image sensors, respectively.

* * * * *